United States Patent
Hwang et al.

(10) Patent No.: US 9,199,204 B2
(45) Date of Patent: Dec. 1, 2015

(54) HYDROGEN-SEPARATION-MEMBRANE PROTECTION LAYER AND A COATING METHOD THEREFOR

(75) Inventors: Kyung-Ran Hwang, Daejeon (KR); Jong-Soo Park, Daejeon (KR); Shin-Kun Ryi, Daejeon (KR); Jin-Suk Lee, Daejeon (KR); Chung-Boo Lee, Daejeon (KR); Sung-Wook Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 14/233,990

(22) PCT Filed: Jul. 20, 2012

(86) PCT No.: PCT/KR2012/005791
§ 371 (c)(1),
(2), (4) Date: Jan. 21, 2014

(87) PCT Pub. No.: WO2013/015566
PCT Pub. Date: Jan. 31, 2013

(65) Prior Publication Data
US 2014/0144322 A1 May 29, 2014

(30) Foreign Application Priority Data

Jul. 22, 2011 (KR) .......... 10-2011-0073215
Dec. 13, 2011 (KR) .......... 10-2011-0133914

(51) Int. Cl.
*B01D 71/02* (2006.01)
*B01D 67/00* (2006.01)
(Continued)

(52) U.S. Cl.
CPC ............ *B01D 71/022* (2013.01); *B01D 53/228* (2013.01); *B01D 67/0088* (2013.01);
(Continued)

(58) Field of Classification Search
CPC .. B01D 53/228; B01D 71/022; B01D 71/025; B01D 71/027; B01D 67/0088; B01D 2256/16; B01D 2257/108; B01D 2325/24; B01D 2325/28; C01B 3/503; B05D 7/24
USPC ......................................... 96/4, 11; 95/55, 56
See application file for complete search history.

(56) References Cited

U.S. PATENT DOCUMENTS

2004/0129135 A1* 7/2004 Roark et al. ............... 95/55
2010/0092353 A1* 4/2010 Noda ...................... 96/11
(Continued)

FOREIGN PATENT DOCUMENTS

JP   H6-310156 A    11/1994
JP   2004-149332 A  5/2004
(Continued)

OTHER PUBLICATIONS

Hwang, K.R., et al., "Catalytic Active Filter for Water-Gas Shift Reaction," *Journal of Chemical Engineering of Japan* 42:S1-S5, The Society of Chemical Engineers, Japan (2009).
(Continued)

*Primary Examiner* — Jason M Greene
(74) *Attorney, Agent, or Firm* — Sterne, Kessler, Goldstein & Fox P.L.L.C.

(57) ABSTRACT

The present invention relates to a method for protecting a hydrogen separation membrane from particulate contaminants in the process of producing or purifying hydrogen by using the separation membrane. The protection layer, wherein a cermet is formed by coating a ceramic and a metal able to cause surface movement of hydrogen molecules and hydrogen atoms to the surface of the separation membrane, plays the role of blocking contact between the separation membrane and particles (contaminant or catalyst) contained in the gas. In this way, it is possible to improve the durability of the hydrogen separation membrane and to minimize effects on the hydrogen permeability of the separation membrane.

6 Claims, 4 Drawing Sheets

(51) Int. Cl.
*B01D 53/22* (2006.01)
*C01B 3/50* (2006.01)

(52) U.S. Cl.
CPC .............. *C01B3/503* (2013.01); *B01D 2256/16* (2013.01); *B01D 2325/06* (2013.01); *B01D 2325/24* (2013.01); *B01D 2325/28* (2013.01)

(56) References Cited

U.S. PATENT DOCUMENTS

| | | | | |
|---|---|---|---|---|
| 2011/0030382 | A1* | 2/2011 | Eadon et al. | 96/11 |
| 2012/0009504 | A1* | 1/2012 | Ramanathan et al. | 429/532 |
| 2014/0144426 | A1* | 5/2014 | Cespedes Montoya et al. | 126/676 |

FOREIGN PATENT DOCUMENTS

| | | | | |
|---|---|---|---|---|
| JP | 2004-176128 | | 6/2004 | |
| JP | 2004-362921 | A | 12/2004 | |
| JP | 2006-095521 | A | 4/2006 | |
| JP | 2006-265076 | A | 10/2006 | |
| JP | 2006-314877 | A | 11/2006 | |
| JP | 2006-314925 | A | 11/2006 | |
| JP | 2006-344486 | A | 12/2006 | |
| JP | 2007-301514 | A | 11/2007 | |
| JP | 2008-098069 | A | 4/2008 | |
| JP | 2008-218293 | A | 9/2008 | |
| JP | 2008-239353 | A | 10/2008 | |
| JP | 2010-094655 | A | 4/2010 | |
| JP | 2011-029149 | A | 2/2011 | |
| KR | 10-0832302 | B1 | 5/2008 | |
| KR | 2011-0049707 | * | 5/2011 | ............ B01D 71/00 |
| KR | 2011-0049707 | A | 5/2011 | |
| KR | 10-2011-0065038 | | 6/2011 | |
| KR | 2010-0126022 | A | 12/2011 | |
| WO | WO 03/076050 | A1 | 9/2003 | |
| WO | WO 2007/043370 | A1 | 4/2007 | |
| WO | WO 2007/086949 | A2 | 8/2007 | |

OTHER PUBLICATIONS

International Search Report and Written Opinion for International Application No. PCT/KR2012/005791, Korean Intellectual Property Office, Korea, Mailed on Jan. 30, 2013.

Supplementary European Search Report and Search Opinion for EP Application No. 12 81 7638, European Patent Office, Munich, Germany, mailed on Mar. 10, 2015.

* cited by examiner

HYDROGEN-SEPARATION-MEMBRANE PROTECTION LAYER AND A COATING METHOD THEREFOR

TECHNICAL FIELD

The present invention relates to a hydrogen separation membrane protective layer and a method of coating the same, and more specifically to a hydrogen separation membrane protective layer formed by coating the surface of a hydrogen separation membrane with metals and ceramics to protect the hydrogen separation membrane from particulate pollutants when the hydrogen separation membrane is installed in a reactor in a hydrogen manufacturing (purification) process. In particular, by preventing pollutants contained in the gas from being introduced, it is possible to improve the durability of the hydrogen separation membrane and minimize the effect on the hydrogen penetration performance of the separation membrane.

BACKGROUND ART

A separation device is necessary to obtain hydrogen from hydrogen mixed gas, and purification of hydrogen is possible by using a variety of separation processes using pressure swing adsorption (PSA), subzero cooling, a separation membrane, or a getter. Since there is an advantage of high energy efficiency by configuring a process using a palladium-based separation membrane in the hydrogen purification technology, a lot of research is under way in this field.

For the performance of a hydrogen separation membrane, hydrogen flux and selectivity are the most important indicators, so a lot of research and effort are being made in domestic and foreign countries for the improvement of such performance. In particular, because the hydrogen penetration rate is determined by the thickness of a hydrogen separation membrane layer, research for coating the ultra-thin membrane of dense material without fine pores is under way.

When a palladium-based alloy is made into an ultra-thin membrane, the effects of the loss and the composition change of the hydrogen separation membrane are increased all the more due to the thermal safety and the attachment of fine dust that can be introduced during the process. That is, whereas a composition change of a maximum of 10% can be expected when pollutants of 1 µm diameter are attached on the surface of a coated separation membrane of 10 µm thickness, a composition change of a maximum of 50% can be expected when particulate pollutants of 1 µm diameter are attached on the surface of a coated membrane of 1 µm thickness. Therefore, it is an obvious phenomenon that the extent of effect by pollutants is further increased as the hydrogen separation membrane becomes thinner.

Recently, there are many attempts to configure a reaction-separation concurrent process by providing a hydrogen separation membrane inside the reactor. In particular, by removing hydrogen, which is a product, for the main purpose of developing the hydrogen manufacturing process using coal or naphtha, the equilibrium conversion rate is facilitated in the normal direction (Reaction Formula 1). Such a reactor uses hydrocarbon as fluidized gas and a micro-catalyst as an in-layer substance, so that, research on a fluidized-bed reactor that maximises contact between the hydrocarbon and the catalyst and also maximizes the heat transfer efficiency is under way (MRT Company of Canada). For the reactor having this configuring, "suppressing the contact between the separation membrane and the particulates is an absolutely necessary condition.

$$CH_4 H_2 O \leftrightarrow CO 3H_2, \text{ Heat of reaction}=206 \text{ kJ/m[Reaction Formula 1]}$$

From examining the papers and precedent patents in the prior art related to the research and development of the separation membrane protective layer by coating porous ceramic materials, metals and ceramic materials on the surface of the hydrogen separation membrane, a technique of composing an ultrathin membrane layer is still at an incomplete stage, and there are no research results from the attempt to place a protective layer on the surface thereof. The only patent (Japanese Patent Laid-Open 2004-176128) that was disclosed is about the concept that resistance to oxygen can be increased and brittleness to hydrogen can be improved by binding a dense foil sheath of palladium-silver composite material on an outside of a foil-type separation membrane.

Therefore, the technological development of these fields is indispensable since it is possible to maintain for a long time a high selectivity and permeability for hydrogen when the development of an ultrathin coating technique, for manufacturing hydrogen separation membranes, and the development of a protective layer, for protecting the ultrathin separation membrane without a decrease of hydrogen penetration performance, are made simultaneously.

DISCLOSURE

Technical Problem

Accordingly, to solve the above-mentioned problems, it is an object of the present invention to provide a protective layer by coating the surface of a dense hydrogen separation membrane with a mixture of metal and ceramic (cermet) that can cause surface migration of hydrogen molecules and hydrogen atoms, Another object of the present invention is to provide a coating method of the protective layer.

Further, the present invention attempts to improve the durability of the hydrogen separation membrane by preventing the contact between the particles (pollutants or catalyst) contained in gas and the separation membrane surface, when providing a hydrogen separation membrane inside the reactor in the hydrogen manufacturing or purification process. At the same time, the effect of the separation membrane on the hydrogen penetration performance due to the protective layer should be minimized.

Technical Solution

In order to protect the hydrogen separation membrane from the particulate pollutants, the present invention provides a separation membrane protective layer prepared by concurrently coating the surface of the hydrogen separation membrane with metals and ceramics to form cermets. Further, in order to improve the durability of the hydrogen separation membrane and minimize the effect of hydrogen penetration, the present invention provides a protective layer prepared by coating the surface of the metal separation membrane with the mixture of metal and ceramic (the cermet) that can cause surface migration of hydrogen molecules or hydrogen atoms simultaneously to prevent the separation membrane surface from contacting with the particulate pollutants or the catalyst in a basic manner, thereby providing stability to the hydrogen separation membrane, while minimizing the effect of the hydrogen separation membrane on the hydrogen penetration performance.

According to the configuration of the above mixture, a disadvantage of the conductibility of ceramic becoming slow can be improved through a mixture of metals, especially, precious metals, and an occurrence of sintering or diffusion into the separation membrane layer due to the self-diffusibility, which is an inherent characteristic of metal, can be suppressed by the ceramic-mixed configuration so as to provide durability of the protective layer itself.

The palladium-based separation membrane having such a characteristic may be coated with palladium alone, palladium-copper, palladium-silver, palladium-nickel, palladium-copper-nickel, palladium-gold, and palladium-ruthenium. Interest is converging on the method how these are to be coated or processed, in a thin-film-made shape or foil shape.

The present invention illustrates and describes the protective layer prepared by coating the surface of a separation membrane coated with a thin film of palladium-based alloy as a model separation membrane of a dense separation membrane with ceramics and metals to form cermets.

The above principle is also applied to transition metal-based separation membranes or ceramic and metal mixed separation membranes including palladium-based alloy separation membranes.

The transition metal-based separation membranes or ceramic and metal mixed separation membranes have excellent performance in electron and proton conduction velocity compared with palladium-based separation membranes. However, it is necessary to coat the surface of the separation membrane with precious metal because the disassociation velocity of hydrogen is low. Therefore, two effects can be satisfied simultaneously by the coating of precious metal-ceramic cermet protective layer according to the present invention.

The present invention discloses a separation membrane protective layer prepared by coating the surface of the dense hydrogen separation membrane with metals and ceramics to form cermets in a hydrogen manufacturing reactor.

The present invention discloses a separation membrane protective layer prepared by coating the surface of the dense hydrogen separation membrane with metals and ceramics to form cermets in hydrogen purification.

The ceramic components may include oxide-based, non-oxide-based, and nitride-based components, or a mixture thereof.

The average diameter of metal and ceramic particles coated and grown on the separation membrane layer may range from 5 nm to 2 μm, and a thickness of the separation membrane protective layer may range from 50 nm to 3 μm.

The separation membrane protective layer may have a porosity of 5 to 50%.

The separation membrane protective layer may be a micro-porous body.

The micro-porous body may include a column type, particle laminated type or a mixture thereof (see FIG. 4).

The dense hydrogen separation membrane may include a palladium-based hydrogen separation membrane. At this time, the palladium-based hydrogen separation membrane may be prepared by coating the surface of the hydrogen separation membrane with any one selected from palladium alone, and palladium-based alloys.

The palladium-based alloys may include at least one selected from palladium-copper, palladium-silver, palladium-nickel, palladium-copper-nickel, palladium-gold, palladium-ruthenium, and palladium-gadolinium.

The dense hydrogen separation membrane may be coated on a porous support.

The palladium-based hydrogen separation membrane may be coated on the porous support.

The dense hydrogen separation membrane may be a foil form.

In particular, the cermet may have a columnar structure, and voids may be formed between the column-shaped cermets so as to expose a part of the surface of the dense hydrogen separation membrane layer. Accordingly, it is possible to improve the durability of the hydrogen separation membrane by preventing the separation membrane surface from contacting with the particles (pollutants or catalyst) contained in gas, and increase the contact area between the gas and the surface of hydrogen separation membrane layer or the surface of the cermet.

The present invention discloses a method for manufacturing a separation membrane protective layer prepared by concurrently coating the surface of the hydrogen separation membrane with metals and ceramics in a hydrogen manufacturing reactor.

The present invention discloses a method for manufacturing a separation membrane protective layer prepared by concurrently coating the surface of the hydrogen separation membrane with metals and ceramics in a hydrogen refiner.

The object of the present invention may be achieved also by coating the protective layer many times repeatedly with metals and ceramics alternately to make it grow into a column form of a predetermined height.

The object of the present inventions may be also achieved by coating the protective layer with a mixture of metal and ceramic in a continuous area and etching a part thereof to form pores.

As the dense separation membrane, palladium-based material is widely used for a commercial purpose. The hydrogen separation membrane is commonly used in a form of a foil or a thin-film-coated porous support. Idaho Tech (U.S.) is developing a Pd—Cu foil type separation membrane by milling/etching and a module using the same, and Mitsubishi Heavy Industry of Japan is developing a module using a foil type separation membrane jointly with Idaho Tech. Also, in many universities of America and China, separation membranes by coating palladium on a porous support are being developed.

The present inventors have made many efforts for developing dense coating membranes (Korean Patent Nos. 0679341, 0622988, and 0614974, and U.S. Pat. No. 7,524,361 B2), and at present research is oriented in the direction of developing a system using the same (Kyung-Ran Hwang, Son-Ki Ihm, Jong-Soo Park, "A catalytic membrane reactor for Water-Gas Shift Reaction," Korean J. Chem. Eng. 27 (2010), 816-621). In this process, the necessity for a protective layer on the surface of the separation membrane was suggested, and it could be achieved through the present invention Advantageous Effects According to the present invention, because the contact between the separation membrane surface and the particulate pollutants or catalyst is prevented by coating a protective layer on the surface of the dense hydrogen separation membrane, it is possible to prevent physicochemical deformation or destruction of the separation membrane due to the particulates that may be contained in gas in various processes that use hydrogen separation membranes. Therefore, competitiveness is enhanced by the improvement of the durability of high-priced separation membranes, and it is possible to prevent pollution of the separation membrane occurring due to a modified catalyst itself by using a compact process in which the catalyst layer and the separation membrane are integrated.

DESCRIPTION OF DRAWINGS

FIGS. 4a to 4d are photographs of a coated hydrogen separation membrane protective layer according to the present invention illustrating the forming of a Cu—$Al_2O_3$ protective layer on the surface of a palladium-based hydrogen separation membrane. Wherein, FIG. 4a is a photograph of the hydrogen separation membrane (surface), FIG. 4c is a photograph of the coated separation membrane protective layer (surface)

BEST MODE

Hereinafter, exemplary embodiments of the present invention will be described in detail with reference to the accompanying drawings. Referring to the drawings, wherein like reference characters designate like or corresponding parts throughout the several views. In the embodiments of the present invention, a detailed description of publicly known functions and configurations that are judged, to be able to make the purport, of the present invention unnecessarily obscure are omitted.

Currently, most of separation membranes are used in high-purity hydrogen purification devices. In this process, contact with ether material on the separation membrane surface of the high-temperature unit is considered to be a cause of loss of separation membrane. In particular, recently in the hydrogen manufacturing process (see Reaction Formula 1 and FIG. 1) using methane, a methane modification reaction can be carried out at a low temperature of 550° C. if a hydrogen separation membrane is applied.

Figure 1:
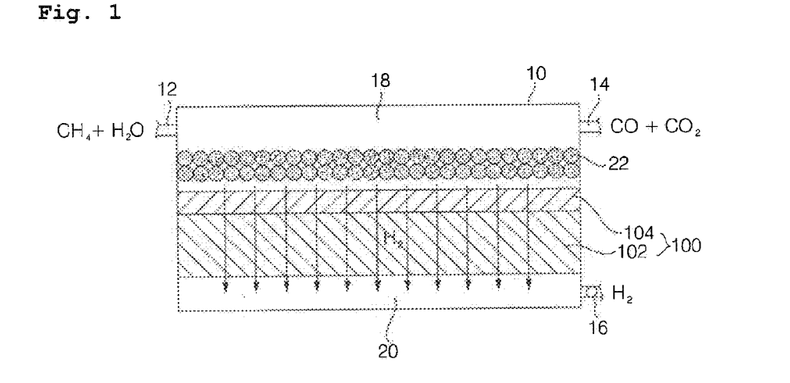
FIG. 1 is a cross-sectional view illustrating a concept of a conventional reaction-separation concurrent process in relation with a modified catalyst and hydrogen separation membrane.

To describe FIG. 1 in more detail, the inner space of a hydrogen separation device 10 is divided into a modified catalyst layer 22 and a hydrogen separation membrane 100. Accordingly, the space of hydrogen manufacture/separation device 10 is divided into a raw material side space 18 above the modified catalyst layer 22 and a separation side space 20 below the hydrogen separation membrane 100. Further, the hydrogen separation membrane 100 has a hydrogen separation membrane layer 104 positioned toward the side near to the modified catalyst layer 22 and the hydrogen separation membrane layer 104 is fixed or coated on the surface of a separation membrane support 102.

Methane ($CH_4$) and steam ($H_2O$) are supplied to the raw material side space 18 through a raw material supply pipe 12 on one side, and carbon monoxide (CO) and carbon dioxide ($CO_2$), which remain after hydrogen ($H_2$) is released, are discharged through a residue discharge pipe 14 on the other side. In addition, a hydrogen discharge pipe 16 is communicated to the separation side space 20, and separated hydrogen ($H_2$) is discharged through the hydrogen discharge pipe 16.

However, to configure a system in such a way that the hydrogen separation membrane 100 and the modified catalyst layer 22 are positioned as close as possible without letting them contact each other, a difficulty ensues in maintaining the space when configuring the process. Further, the modified catalyst layer 22 tends to crumble into fine powder by the vibration applied form the hydrogen separation device 10, and this deposits on the surface of the hydrogen separation membrane layer 104 to provide a cause for loss and damage of the separation membrane. To solve such a problem, a porous plate may be mounted in the middle of the modified catalyst layer 22 and the hydrogen separation membrane 100 so as to prevent contact between the catalyst layer and the separation membrane. However, there is a difficulty in complete isolation of contact between fine powders or particulate substances and hydrogen separation membrane.

Figure 2:
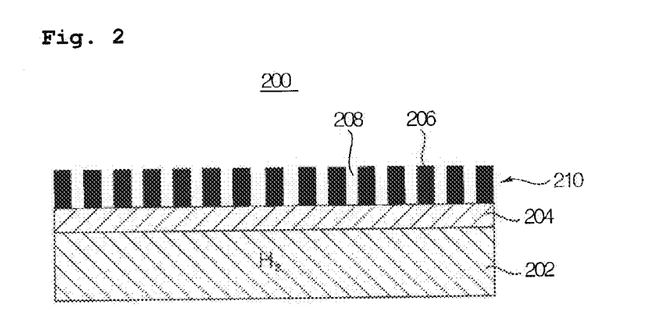
FIG. 2 is a cross-sectional view illustrating a concept of a hydrogen separation membrane protective layer according to the present invention.

Therefore, in the present invention, a separation membrane protective layer 210 is formed on the surface of a hydrogen separation member layer 204 to prevent contact with the pollutants contained in air, so that the durability of the separation membrane is improved and the effect of the formed separation membrane protective layer on hydrogen penetration is minimized.

The pollutants are also mixed into the gas itself in a process (purification) not related with a catalyst, or, fine particulates generated by corrosion of the pipe upstream of the separation membrane are transmitted to the separation membrane. Therefore, it is necessary for a method for protecting the separation membrane from such a pollution source.

Figure 4A:
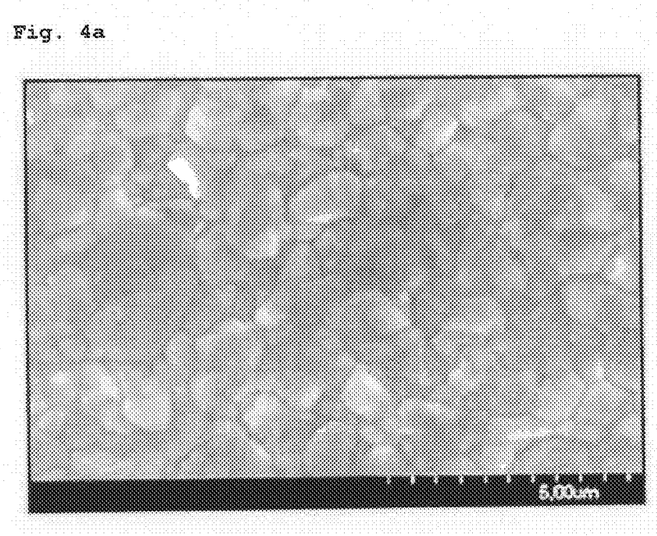
Figure 4B:
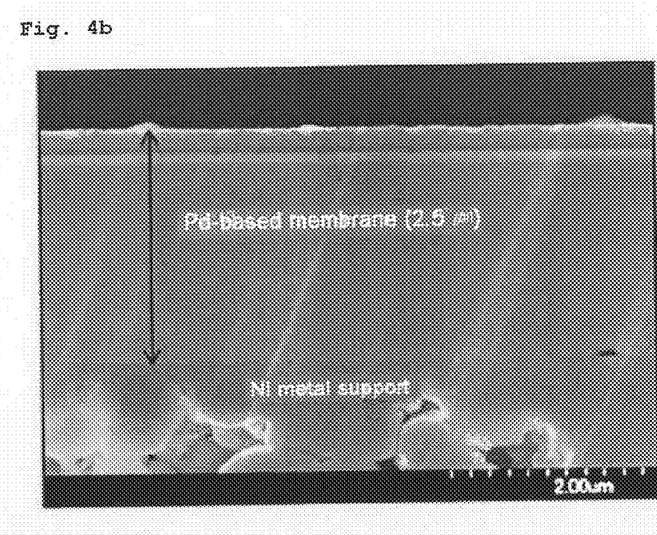
FIG. 4b is a photograph of the hydrogen separation membrane (cross section)
Figure 4C:
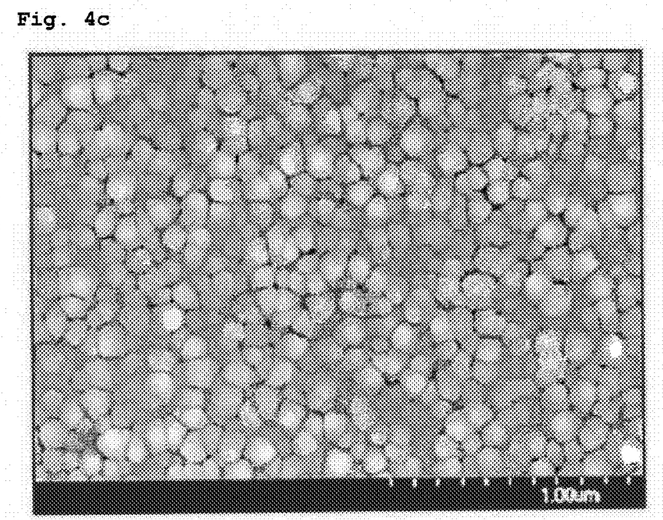
Figure 4D:
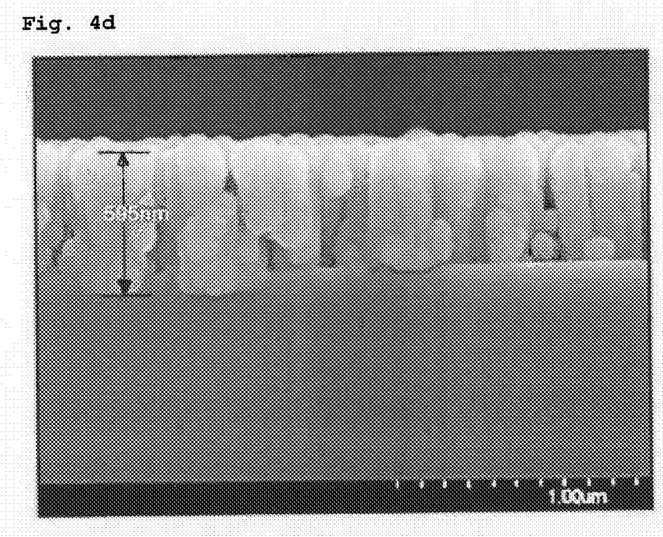
FIG. 4d is a photograph of the coated separation membrane protective layer (cross section).

The separation membrane protective layer according to the present invention is configured in a form of cermet in which metals that can cause surface diffusion of hydrogen molecules or hydrogen atoms concurrently, and at least one of oxide-based ceramic (AlOx, SiOx, TiOx, ZrOx) or nonoxide-based ceramic (AlN, TiN, ZrN, SiC). It is possible to form a porous layer by a concurrent growth method of metal and ceramic material. The thickness of the separation membrane protective layer coated on the surface of the hydrogen separation member layer 204 may range from 50 nm to 3 µm. At this time, the cermet of coated metal and ceramic is formed into mixed and granulated cermet columns 206, as illustrated in FIG. 2. In addition, voids 208 may be formed between cermet columns 206. By such voids, a part of the surface of the dense hydrogen separation membrane layer 204 can be exposed. Accordingly, contact between particles (pollutants or catalyst) contained in gas and the separation membrane is prevented, so that the durability of the hydrogen separation membrane can be improved and also the contact area between the gas and the surface of the hydrogen separation membrane layer or the surface of cermet can be increased. However, the growth type of the cermet is not limited to the column shape, and even if some spherical shapes were included, a fine porous layer shape will suffice for the achievement of the object of the present invention (FIG. 4d). But considering the adhesive force, stronger adhesive force can be obtained if the number of the cermet having granulated shape column is large compared with the case of having the shape of particles coated many times.

Figure 3:
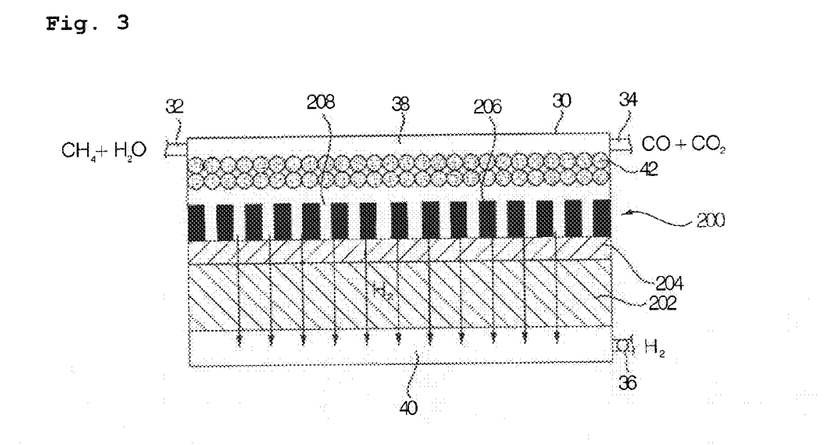
FIG. 3 is a cross-sectional view illustrating a concept of a reaction-separation concurrent process configuration in relation with the modified catalyst and hydrogen separation membrane according to the present invention.

In particular, a range of 10 nm to 2 µm is required for the average diameter of the particles 206 coated on the separation membrane protective layer. Preferably, the required diameter of the particle is in the range of 50 nm to 1 µm. More preferably, the required diameter of the particle is in the range of 50 nm to 300 nm. If configured like this, coating particles are attached firmly on the surface of the hydrogen separation membrane, and the surface area where free surface migration of hydrogen is possible increases, and contact between the particulate pollutants and the hydrogen separation membrane can be avoided (see FIG. 3). Therefore, according to the present invention, preparation of hydrogen can be carried out by a reaction-separation concurrent process including a modified catalyst layer 42 which is disposed at a minimum interval or in lamination so as to be close to the hydrogen separation member layer 204 and the hydrogen separation membrane.

As long as it is possible to make metal and ceramic grow on the metal membrane surface concurrently, any technique may be used for the separation membrane protective layer. Meanwhile, by dividing ceramic and metal into many fine layers and coating many times alternately, the intended goal can be achieved.

One embodiment of the present invention adopted a method whereby a fine metal (Pd) and aluminum oxide (AlOx) layer are coated concurrently by using sputter (RF power). FIGS. 4a to 4d show the actually coated shape. Herein, FIGS. 4a and 4b show the surface and the cross section of a metal separation membrane before coating the protective layer. FIGS. 4c and 4d show the surface and cross section when the protective layer was coated on the surface of a metal separation membrane with metals and ceramics in a cermet form. As shown in FIG. 4d, in order to observe the cross section of the separation layer, the protective layer was coated on the easy-cut-silicon wafer, and then this was cut for observing. As a result of coating, the coated layer is a thin film of about 600 nm and the diameter of the coating particle is about 100 nm. Very fine pores of less than several nm are formed in the space not coated between the metal and the ceramic protective layers, Therefore, it is possible to completely prevent the contact between fine dust of more than several nm or catalyst powders of the modified catalyst layer 42 and the hydrogen separation member layer 204. Furthermore, because a layer to protect against gaseous hydrogen used a metal which can cause surface migration of hydrogen atoms and molecules in the movement process, it does not provide a great effect on the hydrogen penetration performance of the separation membrane even if the hydrogen moves on the surface of the protective layer.

Various methods can be used to coat a metal surface with metals and ceramics so as to make possible the surface migration of hydrogen molecules and hydrogen atoms. As an example, a sol-gel method can be used. However, when coating a flat surface with some surface roughness, such as required for a metal separation membrane, cracking or peeling of the coated surface may occur, whereby complete shielding is impossible. When growing the metals and ceramics to a diameter of 1 μm or less, preferably 300 nm or less, and more preferably 100 nm or less as in the present invention, peeling off due to thermal expansion can be suppressed because the contact area of coating particles is very small and it exists in a cermet form of metal and ceramic, so that it can play a sufficient role as a separation membrane protective layer. That is, when nanoparticles are coated in a multiple layer structure such as the sol-gel or a CVD method, they tend to form a huge lump as sintering proceeds in a three-dimensional network type structure in the heat treatment process, so that the possibility of peeling off from the metal surface is very high. Further, it is difficult to configure a uniform mixture of the metal and ceramic. Therefore, it is preferable that the metals and ceramics are coated on a hydrogen separation membrane layer to be grown in a cermet form as the method of manufacturing a separation membrane protective layer according to the present invention (see FIG. 4c).

Hereinafter, preferred embodiments of the present invention will be described by the following example, however, the example is proposed to more specifically describe the present invention, and the scope of the present invention is not restricted thereto.

EXAMPLE

A porous support was formed by using fine nickel powders with an average diameter of 2 μm, and heat treatment (at 900° C. for 2 hours) was performed in a hydrogen atmosphere to provide a desired strength. Then, wet polishing was performed to adjust the surface roughness to 100 nm or less. Palladium and silver were coated (DC sputter) in sequence and heat-treated in a hydrogen atmosphere to prepare a coated membrane (2.5 μm thickness) penetrable by hydrogen (FIGS. 4a and 4b).

The surface of the hydrogen separation membrane was concurrently coated for 30 minutes by using a sputter (RF power) with Pd and α-$Al_2O_3$ targets mounted thereon. The hydrogen separation membrane had plasma pretreatment for 10 minutes in an $H_2$/Ar gas atmosphere before coating. Subsequently, after applying a vacuum so that the pressure in the coating chamber became $10^{-6}$ torr, coating (20 mtorr) was carried out.

Figure 5:
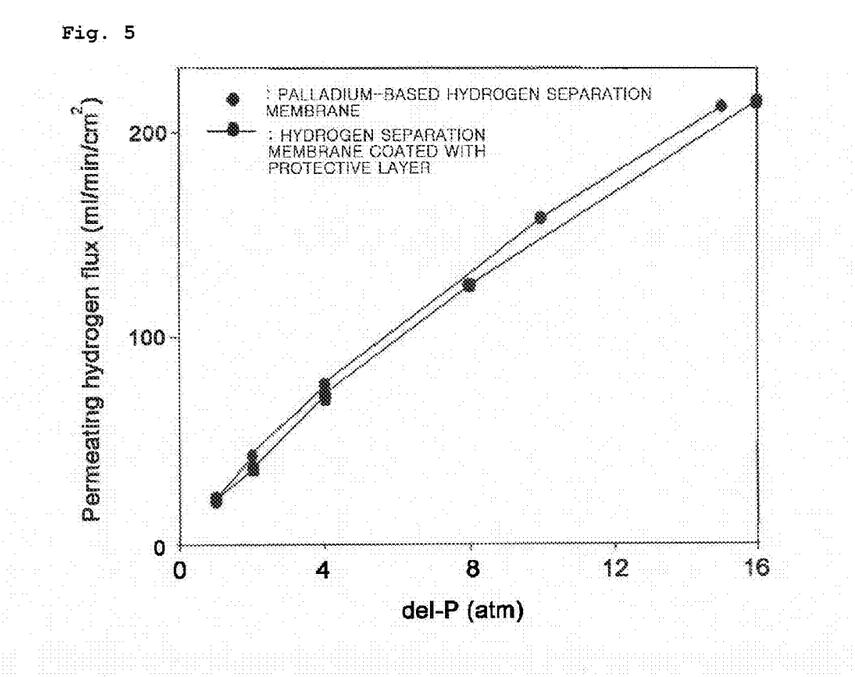
FIG. 5 shows the hydrogen penetration performance of palladium-based separation membranes by pressure at 400° C. after separation membrane protective layer coating according to the present invention.

As a result of coating, the surface of the hydrogen separation membrane was grown (coated) into a form of fine columns as shown in FIGS. 4c and 4d, and the diameter of the coating particles was about 100 nm as shown in FIG. 4c. In order to observe the cross section of the separation layer, a protective layer was coated on an easy-cut-silicon wafer, and then cut it to observe the cross section (4d) of the protective layer. As a result of coating, the coating layer was a thin film of about 600 nm. The separation membrane protective layer should not exert a great influence on the performance of the separation membrane. Since the separation membrane protective layer of the present invention is coated, with metals in such a way that surface migration of hydrogen molecules and hydrogen atoms is possible, it could be seen that not a great influence is exerted on the hydrogen penetration characteristics of the separation membrane even if a protective layer is formed on the hydrogen separation membrane as shown in FIG. 5. A high-pressure unit module was used to measure the separation membrane permeability, which was measured at 400° C. with various pressures. The results of measuring the hydrogen permeability at a pressure difference of IS bar between the front and rear ends of the separation membrane showed that the separation membrane with the protective layer coated thereon had almost no difference (maximum 6% difference) from the separation membrane before coating.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

INDUSTRIAL APPLICABILITY

According to the separation membrane protective layer of the present invention, it is possible to prevent physicochemical deformation or destruction of the separation membrane due to the particulates that may be contained in gas in various processes that use hydrogen separation membranes. Therefore, competitiveness is enhanced by the improvement of the durability of high-priced separation membranes. In particular, since the process in relation with the separation membrane and catalyst can provide a compact process, in which the catalyst layer and separation membrane, that can prevent the pollution of the separation membrane occurring due to the modified catalyst itself, are integrated, it has industrial applicability.

DESCRIPTION OF REFERENCE NUMERALS

10, 30: hydrogen separation device
12, 32: raw material supply pipe
14, 34: residue discharge pipe
16, 36: hydrogen discharge pipe
18, 38: raw material side space
20, 40: separation side space
22, 42: modified catalyst layer
100, 200 hydrogen separation membrane
102, 202: separation membrane support
104, 204: separation membrane layer
200, 210: separation membrane protective layer
206: cermet column, 208: void

The invention claimed is:

1. A separation membrane protective layer structure comprising: a separation membrane protective layer of cermets which are prepared by coating a surface of a dense hydrogen separation membrane layer with ceramics and metals adapted to cause surface migration of hydrogen molecules and hydrogen atoms, wherein the cermets have a columnar structure.

2. The separation membrane protective layer structure according to claim 1, wherein the separation membrane protective layer has a thickness of 50 nm to 3 μm, and the average diameter of metal and ceramic coated and grown on the separation membrane layer ranges from 5 nm to 2 μm.

3. The separation membrane protective layer structure according to claim 1, wherein the separation membrane protective layer has a porosity of 5 to 50%.

4. The separation membrane protective layer structure according to claim 1, wherein the ceramic components include any one of oxide-based, non-oxide-based, and nitride-based components, or a mixture thereof.

5. The separation membrane protective layer structure according to claim 1, wherein voids are formed between the cermets so as to expose a part of the surface of the dense hydrogen separation membrane layer.

6. A method of manufacturing a hydrogen separation membrane protective layer comprising: coating a surface of a dense hydrogen separation membrane layer with metals and ceramics to form columnar cermets.

* * * * *